(12) United States Patent
Weiss et al.

(10) Patent No.: US 11,766,938 B1
(45) Date of Patent: Sep. 26, 2023

(54) AUGMENTED REALITY HEAD-UP DISPLAY FOR OVERLAYING A NOTIFICATION SYMBOL OVER A VISUALLY IMPERCEPTIBLE OBJECT

(71) Applicant: GM Global Technology Operations LLC, Detroit, MI (US)

(72) Inventors: John P. Weiss, Shelby Township, MI (US); Joseph F. Szczerba, Grand Blanc, MI (US); Omer Tsimhoni, Bloomfield Hills, MI (US); Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/702,093

(22) Filed: Mar. 23, 2022

(51) Int. Cl.
| | |
|---|---|
| *B60K 35/00* | (2006.01) |
| *G06T 11/00* | (2006.01) |
| *G06T 3/40* | (2006.01) |
| *G06V 10/60* | (2022.01) |
| *G02B 27/01* | (2006.01) |
| *G06V 20/56* | (2022.01) |
| *G01S 13/931* | (2020.01) |

(52) U.S. Cl.
CPC .......... *B60K 35/00* (2013.01); *G02B 27/0101* (2013.01); *G06T 3/40* (2013.01); *G06T 11/001* (2013.01); *G06V 10/60* (2022.01); *G06V 20/56* (2022.01); *B60K 2370/1529* (2019.05); *B60K 2370/166* (2019.05); *B60K 2370/167* (2019.05); *B60K 2370/168* (2019.05); *B60K 2370/177* (2019.05); *B60K 2370/178* (2019.05); *B60K 2370/21* (2019.05); *B60K 2370/52* (2019.05); *G01S 13/931* (2013.01); *G01S 2013/9323* (2020.01); *G02B 2027/0138* (2013.01)

(58) Field of Classification Search
None
See application file for complete search history.

(56) References Cited

U.S. PATENT DOCUMENTS

| | | | | | |
|---|---|---|---|---|---|
| 5,995,903 | A | * | 11/1999 | Smith | ...................... G06T 17/05 340/995.26 |
| 7,920,250 | B2 | * | 4/2011 | Robert | ................ B60R 16/0237 356/28 |

(Continued)

*Primary Examiner* — Jason A Pringle-Parker
(74) *Attorney, Agent, or Firm* — Vivacqua Crane, PLLC

(57) ABSTRACT

An augmented reality head-up display system for displaying graphics upon a windscreen of a vehicle includes a controller in electronic communication with one or more non-visual object detection sensors, one or more image-capturing devices, and a graphic projection device. The controller executes instructions to receive a plurality of detection points that indicate a presence of an object from the one or more non-visual object detection sensors. The controller executes instructions to compare the plurality of detection points with the image data of the environment surrounding the vehicle to identify a visually imperceptible object located in the environment. In response to identifying the visually imperceptible object, the controller determines a notification symbol that signifies the visually imperceptible object. The notification symbol is overlaid at a position upon the windscreen where the visually imperceptible object would normally be visible.

20 Claims, 3 Drawing Sheets

(56) References Cited

U.S. PATENT DOCUMENTS

| | | | | |
|---|---|---|---|---|
| 10,846,833 B2* | 11/2020 | Alahmar | ............... | B60R 1/00 |
| 2007/0031006 A1* | 2/2007 | Leleve | ............... | G06T 7/66 |
| | | | | 382/104 |
| 2007/0230800 A1* | 10/2007 | Miyahara | ............... | G06T 7/579 |
| | | | | 701/1 |
| 2008/0061950 A1* | 3/2008 | Kawasaki | ............... | G06V 20/58 |
| | | | | 340/425.5 |
| 2009/0118909 A1* | 5/2009 | Rebut | ............... | G01N 21/538 |
| | | | | 701/49 |
| 2010/0253540 A1* | 10/2010 | Seder | ............... | G08G 1/166 |
| | | | | 348/148 |
| 2012/0001742 A1* | 1/2012 | Nozoe | ............... | B60Q 9/007 |
| | | | | 701/49 |
| 2014/0093131 A1* | 4/2014 | Fan | ............... | G06V 20/20 |
| | | | | 382/104 |
| 2015/0310313 A1* | 10/2015 | Murayama | ............... | G06V 20/56 |
| | | | | 382/104 |
| 2015/0352952 A1* | 12/2015 | Kneuper | ............... | B64D 47/08 |
| | | | | 701/36 |
| 2016/0327402 A1* | 11/2016 | Funabiki | ............... | G08G 1/09623 |
| 2017/0192091 A1* | 7/2017 | Felix | ............... | G06T 19/006 |
| 2017/0345321 A1* | 11/2017 | Cross | ............... | B64D 45/08 |
| 2018/0129854 A1* | 5/2018 | Jeon | ............... | G06T 19/006 |
| 2018/0141563 A1* | 5/2018 | Becker | ............... | G06T 7/11 |
| 2018/0201134 A1* | 7/2018 | Choi | ............... | G06T 17/05 |
| 2018/0211121 A1* | 7/2018 | Moosaei | ............... | G01S 17/931 |
| 2018/0328752 A1* | 11/2018 | Tomatsu | ............... | G01C 21/365 |
| 2020/0324787 A1* | 10/2020 | Wang | ............... | B60W 40/02 |

* cited by examiner

AUGMENTED REALITY HEAD-UP DISPLAY FOR OVERLAYING A NOTIFICATION SYMBOL OVER A VISUALLY IMPERCEPTIBLE OBJECT

INTRODUCTION

The present disclosure relates to an augmented reality head-up display for generating a notification symbol upon the windscreen of a vehicle. The notification symbol is overlaid at a position upon the windscreen where the visually imperceptible object would normally be visible.

Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness.

However, while current augmented reality head-up displays achieve their intended purpose, there is a need in the art for an improved approach for providing information to vehicle occupants.

SUMMARY

According to several aspects, an augmented reality head-up display system for displaying graphics upon a windscreen of a vehicle is disclosed. The augmented reality head-up display system includes one or more non-visual object detection sensors to detect objects in an environment surrounding the vehicle, and one or more image-capturing devices that capture image data of the environment surrounding the vehicle, and a graphic projection device for generating images upon the windscreen of the vehicle. The system also includes a controller in electronic communication with the one or more non-visual object detection sensors, the one or more image-capturing devices, and the graphic projection device, wherein the controller executes instructions to receive a plurality of detection points that indicate a presence of an object from the one or more non-visual object detection sensors and the image data from the one or more non-visual object detection sensors. The controller compares the plurality of detection points with the image data of the environment surrounding the vehicle to identify a visually imperceptible object located in the environment. In response to identifying the visually imperceptible object, the controller determines a notification symbol that signifies the visually imperceptible object. Finally, the controller instructs the graphic projection device to generate the notification symbol upon the windscreen of the vehicle, wherein the notification symbol is overlaid at a position upon the windscreen where the visually imperceptible object would normally be visible.

In another aspect, the controller executes instructions to determine a rate of approach towards the visually imperceptible object by the vehicle and adjusts at least one visual parameter of the notification symbol based on the rate of approach towards the visually imperceptible object by the vehicle.

In yet another aspect, the visual parameter is an overall size of the notification symbol, and where the overall size of the notification symbol increases as the vehicle travels towards the visually imperceptible object and the overall size of the notification symbol decreases as the vehicle travels away from the visually imperceptible object.

In an aspect, the visual parameter is a color of the notification symbol.

In another aspect, the controller executes instructions to receive perception data indicative of human vision relative to camera vision, calculate a driver's field of view based on the perception data, and identify the visually imperceptible object based on the perception data.

In yet another aspect, the perception data includes one or more of the following: ambient lighting conditions, sun position, headlamp coverage, and weather input.

In an aspect, identifying the visually imperceptible object is determined based on driver vision capability.

In another aspect, the one or more non-visual object detection sensors include one or more of the following: a radar, LiDAR, and one or more infrared sensors.

In yet another aspect, the controller identifies the visually imperceptible object by determining a luminance contrast ratio between the plurality of detection points and the image data of the environment surrounding the vehicle.

In an aspect, the controller instructs the graphic projection device of the augmented reality head-up display system to project cluster content information within a near-field image plane of the windscreen.

In another aspect, information regarding the notification symbol displayed within the near-field image plane.

In yet another aspect, the controller instructs the graphic projection device to project the notification symbol within a far-field image plane of the windscreen.

In an aspect, the notification symbol is one of the following: a caution symbol, a vehicle icon, an animal icon, and a pedestrian icon.

In another aspect, the visually imperceptible object is one of the following: roadway signage, roadway markings, another vehicle, a pedestrian, a bicyclist, a traffic incident, and road conditions that require attention.

In an aspect, a method for displaying graphics upon a windscreen of a vehicle. The method includes receiving, by a controller, a plurality of detection points that indicate a presence of an object from one or more non-visual object detection sensors and image data from one or more image-capturing devices. The method includes comparing the plurality of detection points with the image data of the environment surrounding the vehicle to identify a visually imperceptible object located in the environment. In response to identifying the visually imperceptible object, the method includes determining a notification symbol that signifies the visually imperceptible object. Finally, the method includes instructing, by the controller, a graphic projection device to generate the notification symbol upon the windscreen of the vehicle, where the notification symbol is overlaid at a position upon the windscreen where the visually imperceptible object would normally be visible.

In another aspect, the method includes determining a rate of approach towards the visually imperceptible object by the vehicle and adjusting at least one visual parameter of the notification symbol based on the rate of approach towards the visually imperceptible object by the vehicle.

In yet another aspect, the method includes receiving perception data indicative of human vision relative to camera vision, calculating a driver's field of view based on the perception data, and identifying the visually imperceptible object based on the perception data.

In an aspect, an augmented reality head-up display system for displaying graphics upon a windscreen of a vehicle. The augmented reality head-up display system includes one or more non-visual object detection sensors to detect objects in an environment surrounding the vehicle, one or more image-capturing devices that capture image data of the environment surrounding the vehicle, a graphic projection device for generating images upon the windscreen of the vehicle, and a controller in electronic communication with the one or more non-visual object detection sensors, the one or more image-capturing devices, and the graphic projection device. The controller executes instructions to receive a plurality of detection points that indicate a presence of an object from the one or more non-visual object detection sensors. The controller compares the plurality of detection points with the image data of the environment surrounding the vehicle to identify a visually imperceptible object located in the environment. In response to identifying the visually imperceptible object, the controller determines a notification symbol that signifies the visually imperceptible object. The controller instructs the graphic projection device to generate the notification symbol upon the windscreen of the vehicle, wherein the notification symbol is overlaid at a position upon the windscreen where the visually imperceptible object would normally be visible. The controller determines a rate of approach towards the visually imperceptible object by the vehicle and adjusts at least one visual parameter of the notification symbol based on the rate of approach towards the visually imperceptible object by the vehicle.

In an aspect, the visual parameter is an overall size of the notification symbol, and the overall size of the notification symbol increases as the vehicle travels towards the visually imperceptible object and the overall size of the notification symbol decreases as the vehicle travels away from the visually imperceptible object.

In an aspect, the controller executes instructions to receive perception data indicative of human vision relative to camera vision, calculate a driver's field of view based on the perception data, and identify the visually imperceptible object based on the perception data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
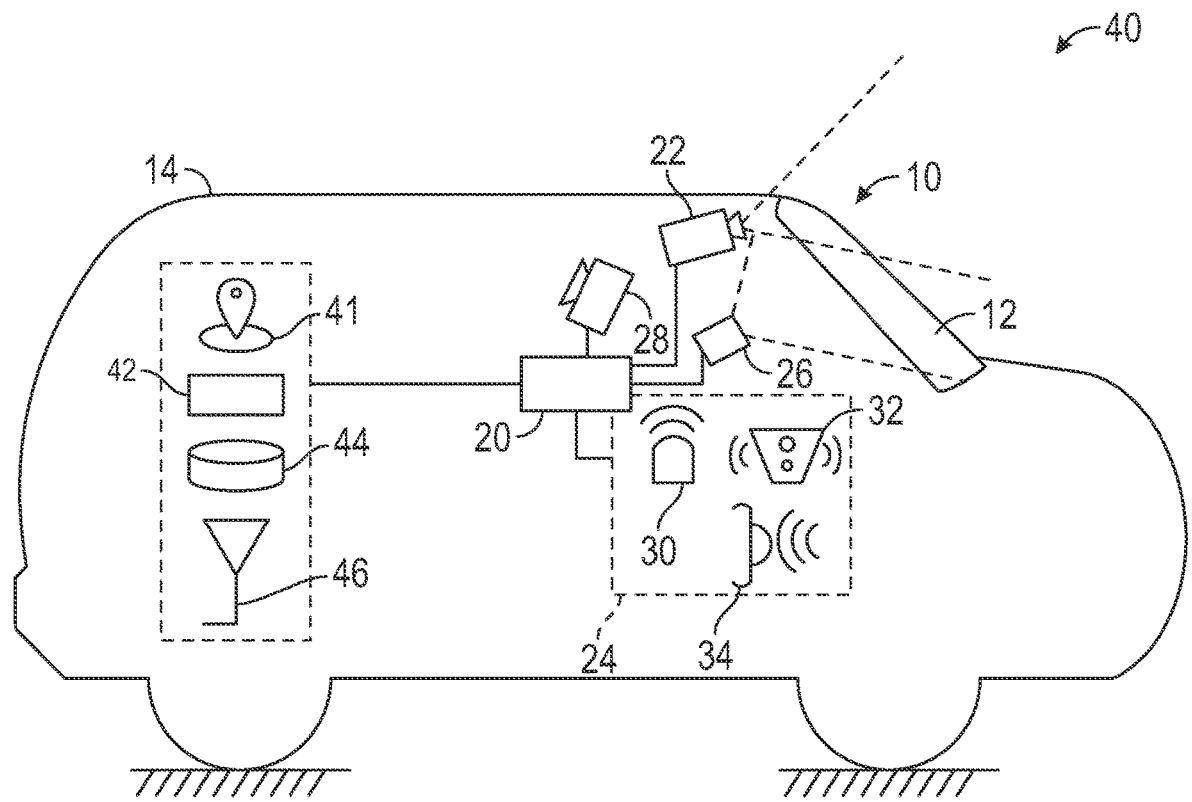
FIG. 1 is a schematic diagram of the disclosed augmented reality head-up display system for displaying graphics upon a windscreen of a vehicle, according to an exemplary embodiment

Referring to FIG. 1, an exemplary augmented reality head-up display system 10 for displaying graphics upon a windscreen 12 of a vehicle 14 is illustrated. The augmented reality head-up display system 10 includes one or more controllers 20 in electronic communication with one or more image-capturing devices 22, one or more non-visual object detection sensors 24, a graphic projection device 26, and an eye location system 28. The image-capturing devices 22 may be cameras that obtain periodic or sequential images. The one or more non-visual object detection sensors 24 are configured to detect a position, velocity, and direction of travel of objects in an environment 40 surrounding the vehicle 14. In the example as shown in FIG. 1, the one or more non-visual object detection sensors 24 include a radar 30, LiDAR 32, and one or more infrared sensors 34, however, it is to be appreciated that other sensors that employ non-visual techniques to detect the presence of objects may be used as well. Moreover, information from other sensors may be used as well. The graphic projection device 26 is configured to generate images upon the windscreen 12 of the vehicle 14 and includes a projection device for creating an excitation light for projecting images. The eye location system 28 includes one or more sensors for determining the location of a head of the driver of the vehicle 14 as well as the orientation or gaze location of the driver's eyes. It is to be appreciated that the vehicle 14 may be any type of vehicle such as, but not limited to, a sedan, truck, sport utility vehicle, van, or motor home. It is also to be appreciated that the vehicle 14 is not limited to an automobile, and may be any other type of land vehicle, marine vehicle, or air vehicle. In an embodiment, the vehicle 14 is an autonomous or semi-autonomous vehicle. However, it is to be appreciated that a manually driven vehicle may be used as well.

The one or more controllers 20 may also be in electronic communication with a global positioning system (GPS) 41, one or more vehicle systems 42, one or more road databases 44, and one or more external networks 46. The one or more vehicle systems 42 include, but are not limited to, a driver monitoring system (DMS) and an automated driving system. The vehicle 14 may wirelessly connect to the one or more external networks 46. Some examples of external networks 46 include, but are not limited to, cellular networks, dedicated short-range communications (DSRC) networks, and vehicle-to-infrastructure (V2X) networks.

Figure 2:
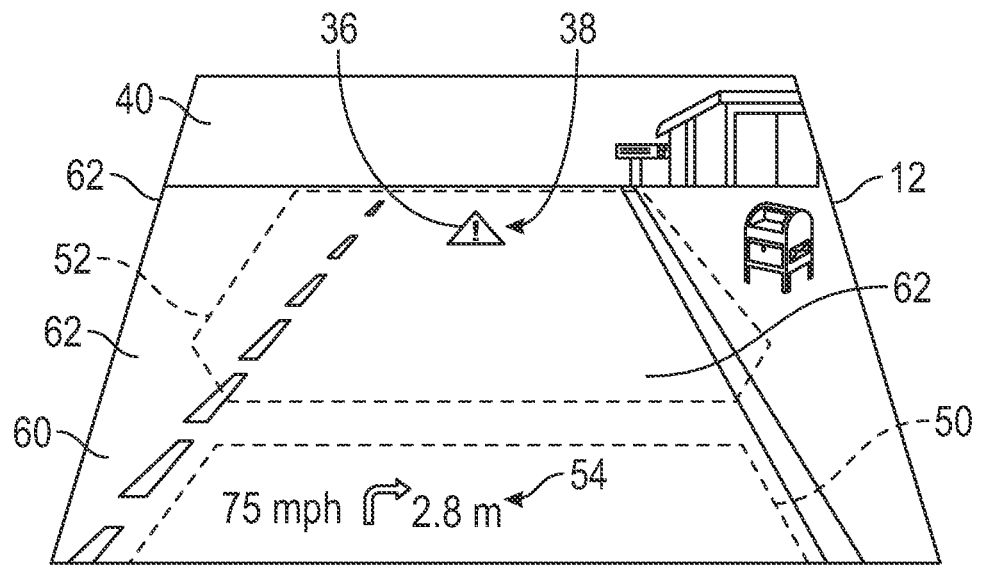
FIG. 2 illustrates an interior view of the windscreen illustrating a notification symbol overlaid at a position on the windscreen where a visually imperceptible object is located, according to an exemplary embodiment.

FIG. 2 is an exemplary interior view of the windscreen 12, where the environment 40 surrounding the vehicle 14 is visible through the windscreen 12. It is to be appreciated that the images generated by the graphic projection module 26 are projected as light upon the windscreen 12, where the light is reflected off the windscreen 12 and is directed to a driver of the vehicle 14. Thus, the images generated by the graphic projection module 26 appear to be in front of the vehicle 12, and beyond the windscreen 12, when viewed by a driver. Referring to both FIGS. 1 and 2, the augmented reality head-up display system 10 identifies a visually imperceptible object located in the environment 40 surrounding the vehicle 14. The visually imperceptible object is any type of incident or object situated along a roadway 60 that the vehicle 14 travels along. Some examples of visually imperceptible objects include, but are not limited to, roadway signage and markings, another vehicle, a pedestrian, a bicyclist, a traffic incident, or road conditions that require attention. Some examples of road conditions that require attention include, but are not limited to, icy or slippery road surfaces, potholes, and debris obstructing the roadway 60. It is to be appreciated that the visually imperceptible object is not visible to a driver of the vehicle 14 because of low-visibility conditions that reduce the driver's ability to view objects on the roadway 60. Some examples of low-visibility conditions include, but are not limited to, snow, rain, fog, nighttime conditions, and low-light conditions.

Figures 3A, 3B, 3C:
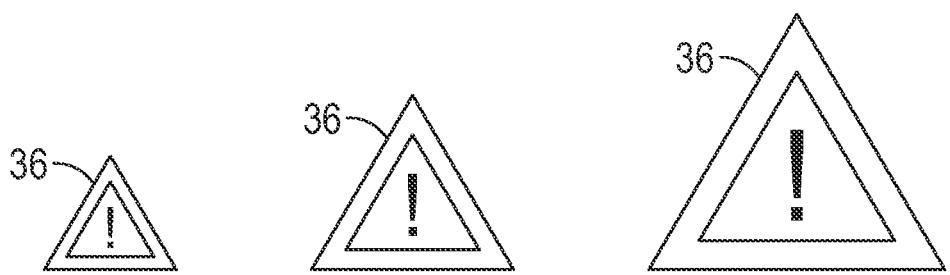
FIGS. 3A-3C illustrate the notification symbol shown in FIG. 2 increasing in overall size, according to an exemplary embodiment.
Figures 4A, 4B, 4C:
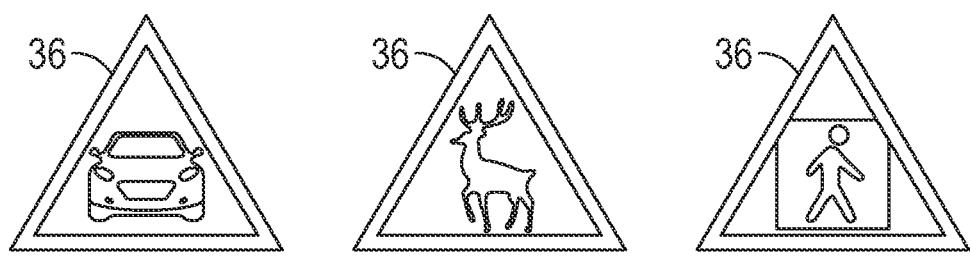
FIGS. 4A-4C illustrate various types of notification symbols, according to an exemplary embodiment.

As explained below, in response to identifying the visually imperceptible object, the augmented reality head-up display system 10 determines a notification symbol 36 that signifies the visually imperceptible object. As seen in FIG. 2, the notification symbol 36 is generated upon the windscreen 12 of the vehicle 14 and is overlaid at a position 38 upon the windscreen 12 where the visually imperceptible object would normally be visible by the driver. In other words, if the low-visibility conditions were not present, then the driver would be able to view the visually imperceptible object. For example, if the fog were to clear, then the driver of the vehicle 14 would be able to view a roadway sign that is otherwise visually imperceptible. In the example as shown in FIG. 2, the notification symbol 36 is a caution symbol, however, it is to be appreciated that other types of symbols may be used as well and are illustrated in FIGS. 4A-4B. As also explained below, the augmented reality head-up display system 10 determines a rate of approach towards the visually imperceptible object by the vehicle 14 and adjusts at least one visual parameter of the notification symbol 36 based on the rate of approach towards the vehicle 14. For example, as seen in FIGS. 3A-3C, in an embodiment the visual parameter of the notification symbol 36 is an overall size, and as the vehicle 14 approaches the visually imperceptible object, the overall size of the notification symbol 36 increases.

Referring to FIGS. 1 and 2, the windscreen 12 includes a first, near-field image plane 50 and a second, far-field image plane 52, however, it is to be appreciated that more than two image planes may be used as well. The controller 20 instructs the graphic projection device 26 of the augmented reality head-up display system 10 to project cluster content information 54 upon the windscreen 12 within the near-field image plane 50. The cluster content information 54 informs the driver of the vehicle 14 of driving conditions such as, but not limited to, vehicle speed, speed limit, gear position, fuel level, current position, and navigational instructions. In the example as shown in FIG. 2, the cluster content information 54 includes vehicle speed and navigational directions. In an embodiment, the augmented reality head-up display system 10 projects information regarding the notification symbol 36 upon the windscreen 12 within the near-field image plane 50. Some examples of information regarding the notification symbol 36 include a description of the visually imperceptible object (i.e., is the visually imperceptible object debris on the roadway 60, another vehicle, a road sign, etc.) and a distance to the visually imperceptible object from the vehicle 14.

The controller 20 instructs the graphic projection device 26 to project the notification symbol 36 upon the windscreen 12 within the far-field image plane 52, where the notification symbol 36 is overlaid at a position 38 upon the windscreen 12 where the visually imperceptible object would normally be visible. The far-field image plane 52 contains images overlaid upon the roadway 60 that is visible through the windscreen 12. In the embodiment as shown in FIG. 2, the far-field image plane 52 only covers a portion of the entire plane of the windscreen 12, however, it is to be appreciated that in another implementation the far-field image plane 52 may cover the entire plane of the windscreen 12 that is not occupied by the near-field image plane 50. Moreover, although FIG. 2 illustrates the far-field image plane 52 only spanning across a portion of the lanes 62 that are part of the roadway 60, in embodiments the far-field image plane 52 spans across each lane 62 across the roadway 60.

The notification symbol 36 includes any type of graphic image that provides an alert to direct the attention of the driver of the vehicle 14 towards the position 38 of the visually imperceptible object. In the example as shown in FIG. 2, the notification symbol 36 is a caution symbol, however, it is to be appreciated that other types of symbols may be used as well. For example, as seen in FIG. 4A, the notification symbol 36 includes a vehicle icon to alert the driver to a vehicle that is visually imperceptible. In the embodiment as shown in FIG. 4B, the notification symbol 36 includes an animal icon to alert the driver to wildlife that are visually imperceptible. In the embodiment as shown in FIG. 4C, the notification symbol 36 includes a pedestrian icon to alert the driver to a pedestrian that is visually imperceptible. Other examples of symbols that may be used as the notification symbol 36 include, but are not limited to, traffic sign icons, slippery roadway icons, traffic lights, a stopped vehicle, pedestrians, animals, cross traffic, and the edge of the road. In embodiments, the notification symbol 36 may be animated as well to draw attention to the driver's eye. For example, an alert may be transient to draw the driver's attention to a particular region in the visual field.

Referring back to FIG. 1, the image-capturing devices 22 obtain image data of the environment 40 surrounding the vehicle 14. The one or more non-visual object detection sensors 24 obtain data in the form of detection points that indicate a presence of an object within the environment 40 of the vehicle 14. The controller 20 receives the plurality of detection points that indicate a presence of the object and the image data. The controller 20 compares the plurality of detection points with the image data to identify the visually imperceptible object.

In embodiments, the controller 20 identifies the visually imperceptible object based on the driver's vision capabilities. The driver's vision capabilities are entered manually or, in the alternative, may be inferred based on age. In another embodiment, the controller 20 identifies the visually imperceptible object based on driver perception data received from the eye location system 28, where the driver perception data includes the location of a head of the driver and the orientation or gaze location of the driver's eyes. It is to be appreciated that the driver eye and head positions are at a different location than the image-capturing devices 22, and therefore there may be areas in the environment 40 that the driver may view that are not captured by the image-capturing devices 22, and vice versa. Furthermore, the different locations between the driver eye and the head position may be calculated as well.

In an embodiment, the controller 20 identifies the visually imperceptible object by first determining a luminance contrast ratio between the plurality of detection points with the image data of the environment 40, and then compares the luminance contrast ratio with a contrast threshold ratio. Specifically, the image data captured from the one or more image-capturing devices 22 includes data indicating both object luminescence and background luminescence, where the luminescence contrast ratio is determined based on the object and the background luminescence. In response to determining the luminance contrast ratio is greater than or equal to the contrast threshold ratio, the controller 20 identifies the object being detected as the visually imperceptible object.

In response to identifying the visually imperceptible object, the controller 20 determines the notification symbol 36 (FIG. 2) that signifies the visually imperceptible object. The controller 20 then instructs the graphic projection device 26 to generate the notification symbol 36 upon the windscreen 12 of the vehicle 14. As seen in FIG. 2, the notification symbol 36 is overlaid at the position 38 of the visually imperceptible object. It is to be appreciated that the controller 20 calculates a type of symbol, the size, the shape, and the color of the notification symbol 36 based on the driver eye position, a location of the vehicle 14, and data regarding the environment 40 such as, but not limited to, data from an inclinometer, vehicle speed, roadway curvature, and steering angle.

In embodiments, the controller 20 determines a rate of approach towards the visually imperceptible object by the vehicle 14 based on one or more inputs from the one or more image-capturing devices 22, the one or more non-visual object detection sensors 24, the one or more vehicle systems 42, the one or more road databases 44, and the one or more external networks 46. Referring to FIGS. 1 and 3A-3B, the controller adjusts at least one visual parameter of the notification symbol 36 based on the rate of approach towards the visually imperceptible object. In the embodiment as shown in FIGS. 3A-3C, the visual parameter is an overall size of the notification symbol, where the overall size of the notification symbol 36 increases as the vehicle 14 travels towards the visually imperceptible object and the overall size of the notification symbol 36 decreases as the vehicle 14 travels away from the visually imperceptible object. In another embodiment, the visual parameter is a color of the notification symbol, where the color indicates when the vehicle 14 is too close to the visually imperceptible object. For example, the color of the notification symbol may start as yellow, turn to orange as the vehicle 14 approaches the visually impermissible object, and eventually turns to red. In still another embodiment, the visual parameter is an animation of the notification symbol 36. For example, the visual parameter may be size, where the size of the graphic increases or decreases to capture the attention of the driver.

Referring back to FIG. 1, the controller 20 receives perception data indicative of human vision relative to camera vision from the one or more image-capturing devices 22, the one or more non-visual object detection sensors 24, the one or more vehicle systems 42, the one or more road databases 44, and the one or more external networks 46. In embodiments, the perception includes, but is not limited to, ambient lighting conditions, sun position, headlamp coverage, and weather input. The controller 20 calculates a driver's field of view based on the perception data, and further identifies the visually imperceptible object based on the perception data.

Figure 5:
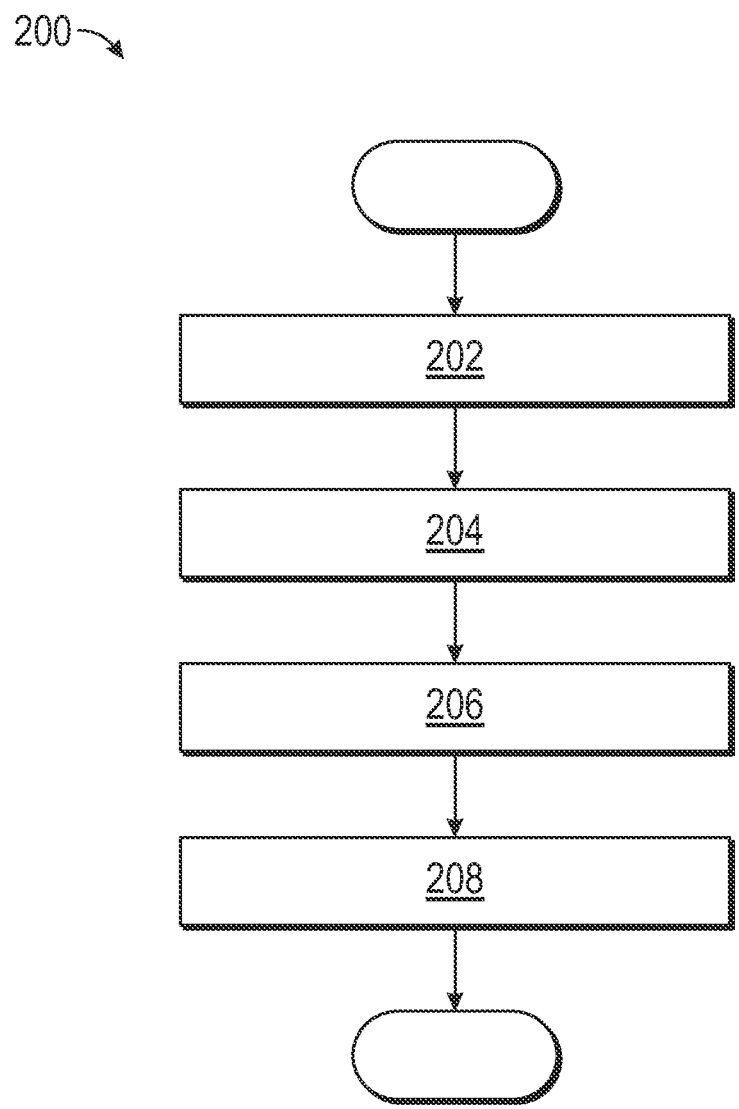
FIG. 5 is a process flow diagram illustrating a method for displaying graphics upon the windscreen of the vehicle by the augmented reality head-up display system, according to an exemplary embodiment.

FIG. 5 is a process flow diagram illustrating a method 200 for displaying the notification symbol 36 upon the windscreen 12 of the vehicle 14 by the augmented reality head-up display system 10. Referring to FIGS. 1, 2, and 5, the method 200 may begin at block 202. In block 202, the controller 20 receives the plurality of detection points that indicate a presence of an object from the one or more non-visual object detection sensors 24 and the image data from one or more image-capturing devices 22. The method 200 may then proceed to block 204.

In block 204, the controller 20 compares the plurality of detection points with the image data of the environment 40 surrounding the vehicle 14 to identify the visually imperceptible object. As mentioned above, in an embodiment, the visually imperceptible object may be identified based by determining a luminance contrast ratio between the plurality of detection points and the image data. The method 200 may then proceed to block 206.

In block 206, in response to identifying the visually imperceptible object, the controller 20 determines the notification symbol 36 that signifies the visually imperceptible object. The method 200 may then proceed to block 208.

In block 208, the controller 20 instructs the graphic projection device 26 to generate the notification symbol 36 upon the windscreen 12 of the vehicle 14. As seen in FIG. 2, the notification symbol 36 is overlaid at a position 38 upon the windscreen 12 where the visually imperceptible object would normally be visible. The method 200 may then terminate.

Referring generally to the figures, the disclosed augmented reality head-up display provides various technical effects and benefits. Specifically, the disclosed augmented reality head-up display generates a notification symbol upon the windscreen of a vehicle to alert the driver of a visually imperceptible object. Therefore, the augmented reality head-up display provides enhanced situational awareness of roadway objects that are not evident to a driver during low-visibility conditions. Moreover, as the vehicle continues to travel towards the visually imperceptible object, the size and color of the notification symbol may change to assist the driver in determining if the visually imperceptible object is stationary, traveling towards the vehicle, or away from the vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An augmented reality head-up display system for displaying graphics upon a windscreen of a vehicle, the augmented reality head-up display system comprising:
one or more non-visual object detection sensors to detect objects in an environment surrounding the vehicle;
one or more cameras that capture image data of the environment surrounding the vehicle;
a graphic projection device for generating images upon the windscreen of the vehicle, wherein the graphic projection device includes a projection device that creates an excitation light that creates the images projected upon the windscreen; and a controller in electronic communication with the one or more non-visual object detection sensors, the one or more cameras, and the graphic projection device, wherein the controller executes instructions to:

receive a plurality of detection points that indicate a presence of an object from the one or more non-visual object detection sensors and the image data from the one or more cameras;

compare the plurality of detection points with the image data of the environment surrounding the vehicle to identify a visually imperceptible object located in the environment;

in response to identifying the visually imperceptible object, determine a notification symbol that signifies the visually imperceptible object; and instruct the graphic projection device to generate the notification symbol upon the windscreen of the vehicle, wherein the notification symbol is overlaid at a position upon the windscreen where the visually imperceptible object would normally be visible.

2. The augmented reality head-up display system of claim 1, wherein the controller executes instructions to:

determine a rate of approach towards the visually imperceptible object by the vehicle; and adjust at least one visual parameter of the notification symbol based on the rate of approach towards the visually imperceptible object by the vehicle.

3. The augmented reality head-up display system of claim 2, wherein the visual parameter is an overall size of the notification symbol, and wherein the overall size of the notification symbol increases as the vehicle travels towards the visually imperceptible object and the overall size of the notification symbol decreases as the vehicle travels away from the visually imperceptible object.

4. The augmented reality head-up display system of claim 1, wherein the visual parameter is a color of the notification symbol.

5. The augmented reality head-up display system of claim 1, wherein the controller executes instructions to:

receive perception data indicative of human vision relative to camera vision;

calculate a driver's field of view based on the perception data; and identify the visually imperceptible object based on the perception data.

6. The augmented reality head-up display system of claim 5, wherein the perception data includes one or more of the following: ambient lighting conditions, sun position, headlamp coverage, and weather input.

7. The augmented reality head-up display system of claim 1, wherein identifying the visually imperceptible object is determined based on driver vision capability.

8. The augmented reality head-up display system of claim 1, wherein the one or more non-visual object detection sensors include one or more of the following: a radar, LiDAR, and one or more infrared sensors.

9. The augmented reality head-up display system of claim 1, wherein the controller identifies the visually imperceptible object by determining a luminance contrast ratio between the plurality of detection points and the image data of the environment surrounding the vehicle.

10. The augmented reality head-up display system of claim 1, wherein the controller instructs the graphic projection device of the augmented reality head-up display system to project cluster content information within a near-field image plane of the windscreen.

11. The augmented reality head-up display system of claim 10, wherein information regarding the notification symbol displayed within the near-field image plane.

12. The augmented reality head-up display system of claim 1, wherein the controller instructs the graphic projection device to project the notification symbol within a far-field image plane of the windscreen.

13. The augmented reality head-up display system of claim 1, wherein the notification symbol is one of the following: a caution symbol, a vehicle icon, an animal icon, and a pedestrian icon.

14. The augmented reality head-up display system of claim 1, wherein the visually imperceptible object is one of the following: roadway signage, roadway markings, another vehicle, a pedestrian, a bicyclist, a traffic incident, and road conditions that require attention.

15. A method for displaying graphics upon a windscreen of a vehicle, the method comprising:

receiving, by a controller, a plurality of detection points that indicate a presence of an object from one or more non-visual object detection sensors and image data from one or more cameras;

comparing the plurality of detection points with the image data of an environment surrounding the vehicle to identify a visually imperceptible object located in the environment;

in response to identifying the visually imperceptible object, determining a notification symbol that signifies the visually imperceptible object; and instructing, by the controller, a graphic projection device to generate the notification symbol upon the windscreen of the vehicle, wherein the notification symbol is overlaid at a position upon the windscreen where the visually imperceptible object would normally be visible, wherein the graphic projection device includes a projection device that creates an excitation light that creates the images projected upon the windscreen.

16. The method of claim 15, further comprising:

determining a rate of approach towards the visually imperceptible object by the vehicle; and adjusting at least one visual parameter of the notification symbol based on the rate of approach towards the visually imperceptible object by the vehicle.

17. The method of claim 15, further comprising:

receiving perception data indicative of human vision relative to camera vision;

calculating a driver's field of view based on the perception data; and identifying the visually imperceptible object based on the perception data.

18. An augmented reality head-up display system for displaying graphics upon a windscreen of a vehicle, the augmented reality head-up display system comprising:

one or more non-visual object detection sensors to detect objects in an environment surrounding the vehicle;

one or more cameras that capture image data of the environment surrounding the vehicle;

a graphic projection device for generating images upon the windscreen of the vehicle, wherein the graphic projection device includes a projection device that creates an excitation light that creates the images projected upon the windscreen; and a controller in electronic communication with the one or more non-visual object detection sensors, the one or more cameras, and the graphic projection device, wherein the controller executes instructions to:

receive a plurality of detection points that indicate a presence of an object from the one or more non-visual object detection sensors;

compare the plurality of detection points with the image data of the environment surrounding the vehicle to identify a visually imperceptible object located in the environment;

in response to identifying the visually imperceptible object, determine a notification symbol that signifies the visually imperceptible object;

instruct the graphic projection device to generate the notification symbol upon the windscreen of the vehicle, wherein the notification symbol is overlaid at a position upon the windscreen where the visually imperceptible object would normally be visible;

determine a rate of approach towards the visually imperceptible object by the vehicle; and adjust at least one visual parameter of the notification symbol based on the rate of approach towards the visually imperceptible object by the vehicle.

19. The augmented reality head-up display system of claim 18, wherein the visual parameter is an overall size of the notification symbol, and wherein the overall size of the notification symbol increases as the vehicle travels towards the visually imperceptible object and the overall size of the notification symbol decreases as the vehicle travels away from the visually imperceptible object.

20. The augmented reality head-up display system of claim 18, wherein the controller executes instructions to:

receive perception data indicative of human vision relative to camera vision;

calculate a driver's field of view based on the perception data; and identify the visually imperceptible object based on the perception data.

\* \* \* \* \*